Jan. 31, 1961    G. F. BLAZS    2,969,777
UNIVERSAL JOINT SUSPENSION FOR NUTATING DISKS
Filed July 17, 1958    2 Sheets-Sheet 1

INVENTOR.
GEORGE F. BLAZS
BY
Herschel C. Imohundro
ATTORNEY

Jan. 31, 1961  G. F. BLAZS  2,969,777
UNIVERSAL JOINT SUSPENSION FOR NUTATING DISKS
Filed July 17, 1958  2 Sheets-Sheet 2

INVENTOR.
GEORGE F. BLAZS
BY
*Herschel C. Omohundro*
ATTORNEY

United States Patent Office 2,969,777
Patented Jan. 31, 1961

2,969,777

UNIVERSAL JOINT SUSPENSION FOR NUTATING DISKS

George F. Blazs, Phoenix, Ariz., assignor to The Garrett Corporation, Los Angeles, Calif., a corporation of California Filed July 17, 1958, Ser. No. 749,272

14 Claims. (Cl. 121—69)

This invention relates generally to fluid pressure machines and more particularly to fluid pressure devices of the nutating disk or wobble plate type which are constructed to pump, compress and/or be driven by compressed gas or other fluids.

Nutating disk-type fluid pumps and motors include means forming a chamber in which a disk is supported for nutation. The chamber is provided with inlet and outlet ports separated by a flow-dividing wall extending across the chamber, and the disk has a slot through which the wall extends. The basic principle of the nutating disk operation requires some means to restrain the disk from rotation about an axis normal to the plane thereof. In some of the simple low-speed devices, rotation of the disk is restrained by overpowering the natural tendency for the disk to rotate or oscillate by having the slot in the disk engage the wall between the inlet and outlet ports or an alternate method is to have a pintle and bearing on the periphery of the disk follow a straight longitudinally directed channel in the housing.

A considerable number of designs have been developed in the past for nutating disk motors and pumps or the like, but none of the older devices using the restraining methods described above are capable of meeting the current high performance demands, due principally to the fact that the disks are forced to follow a straight axial path, which is an unnatural course for nutating movement, and when they are operated at even moderate speeds the inertial forces and friction developed cause undesirable vibration, excessive heating, and destructive wear of the parts therein. The more recent developments in this field, with the object of overcoming the above-mentioned problem, have resulted in devices of very complex design or devices having a short operational life.

It is, therefore, an object of the present invention to provide a high speed positive displacement device which is of simple, compact construction and capable of operating in a wide range of speeds over a long period of time.

Another object of the present invention is to provide a high speed positive displacement pump or motor having high performance characteristics and devoid of inertial and frictional forces which cause undesirable vibrations and wear.

A further object of the present invention is to provide a novel suspension means for the nutating disk or disks in such motors and/or pumps wherein the disk is allowed to move unrestrained through a natural nutating sequence, being simultaneously restrained against rotation about an axis which is perpendicular to the plane of said disk or disks.

A still further object of the present invention is to provide a high speed nutating disk motor and/or pump which employs a universal joint suspension means for the nutating disk wherein the disk is carried by the suspension means through a natural nutating sequence and simultaneously restrained thereby against rotation about an axis perpendicular to the plane of said disk.

These and other objects and advantages of this invention will become apparent to persons skilled in the art from a reading of the attached description, together with the drawings, wherein.

Figure 1:
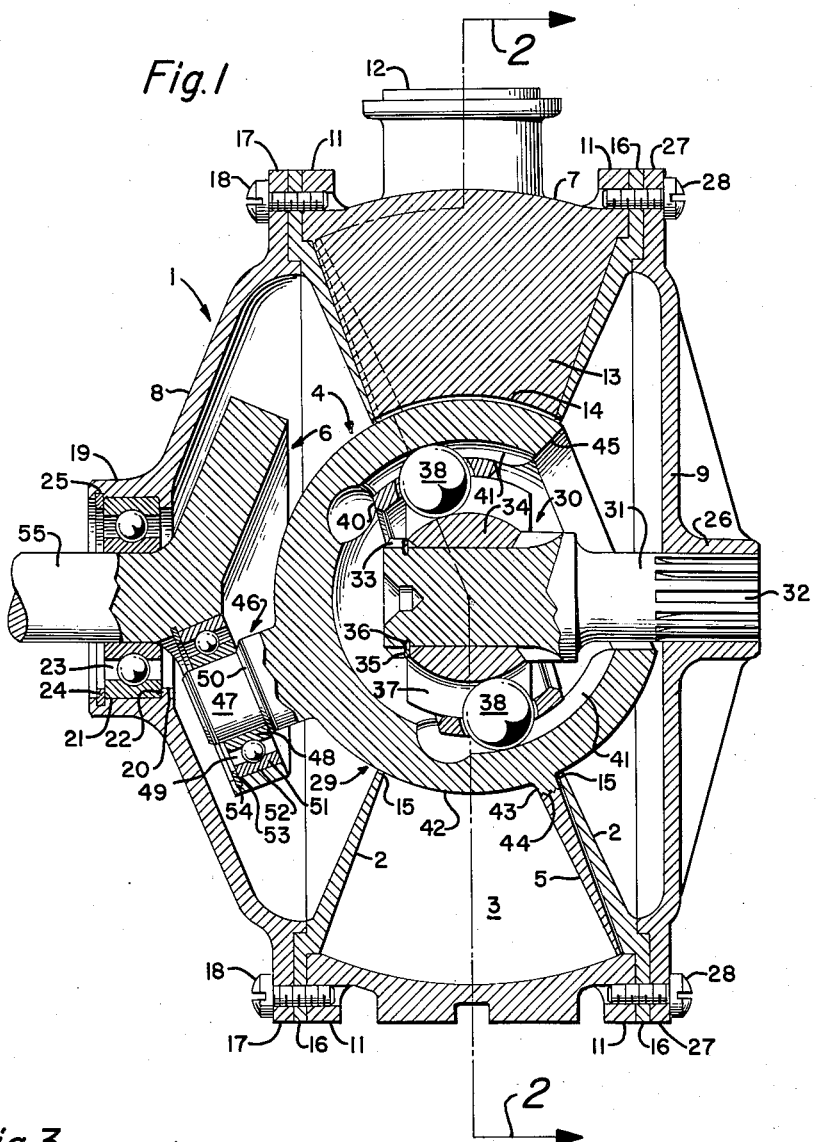
Figure 1 is a longitudinal sectional view of a nutating disk motor and/or pump constructed in accordance with the present invention.

By reference to Fig. 1 of the drawing, it will be seen that the present device employs a three-piece housing 1 and partition walls 2 which when assembled cooperate to form a partially spherical chamber 3 and to encase a universal joint suspension means 4, a nutating disk element 5, and a crank element 6.

The housing 1 comprises a center section 7 and end sections 8 and 9. The center section 7 is in the form of a two-piece ring which is fastened together by screws 10 and is provided with end flanges 11 and a pair of fluid passages 12. An integral axially aligned flow-dividing wall 13 is disposed between the fluid passages 12 and extends radially inward from the ring to end in an arcuate terminus 14. The partition walls 2 are of frustoconical shape, having centrally disposed circular openings 15 therein and peripheral flanges 16. The partitions 2 are disposed at opposite ends of center section 7 in such a manner that the conical surfaces of partitions 2 project inwardly toward a common point of convergence and the flanges 16 engage flanges 11.

The end section 8 is provided with a flange 17 which is held in engagement with flanges 16 and 11 by screws 18. The section 8 is further provided with a centrally disposed boss 19 which contains a bore 20 and a counterbore 21 to form a retaining ledge 22 for an antifriction bearing 23 disposed in counterbore 21. The bearing 23 is held in place by a snap ring 24 which is positioned in an annular groove 25 formed in counterbore 21. The end section 9 includes an internally splined boss 26 and a peripheral flange 27. The flanges 27, 16 and 11 are held in engagement by screws 28.

The universal joint suspension means 4 is disposed in the housing 1 between the partition walls 2 at a position where the pivotal center of the universal joint 4 is coincident with the point of convergence of walls 2 and the outer surfaces thereof are in fluid sealing engagement with edges of openings 15 in walls 2 and the arcuate terminus 14 of wall 13.

The universal joint 4 comprises a movable segment 29 and a fixed segment 30. The segment 30 serves as a fixed support for segment 29 and includes a shaft 31 provided with splined ends 32 and 33. The end 32 of shaft 31 received by the boss 26 of end section 9 and the opposite end 33 receives a splined inner race member 34 which is held in place thereon by a retaining ring 35 disposed in a groove 36. The inner race 34 is provided with longitudinally extending arcuate grooves 37.

The movable segment 29 includes a plurality of ball elements 38 which are contained in a ball cage 40 and are disposed for axial movement in the grooves 37 of the inner race 34 and a corresponding set arcuate grooves 41, formed in a truncated hollow spherical outer race 42. The race 42, in the form of the invention shown, includes a threaded flange 43 to engage a threaded opening 44 in the nutating disk 5; it is further provided with a circular opening 45 and an integral pintle 46. The pintle 46 is located diametrically opposite the opening 45 and is provided with a reduced section 47 to receive the inner race 48 of an intifriction bearing 49 which abuts a shoulder 50 formed on the pintle 46. The outer race 51 of bearing 49 is disposed in an eccentrically located circular opening 52 provided in the counter-balanced crank element 6. The bearing 49 is retained in position on the pintle 46 and in the opening 52 of the crank 6 by a snap ring 53 disposed in an annular groove 54 formed in the boundary of opening 52. A shaft 55, forming a part of crank 6, extends axially outward from housing 1 and is journaled for rotation in bearing 23.

It will be noted that the disk 5 is recessed to receive the wall 13 and is rigidly fixed to the outer race 42 of the universal joint 4 and the outer race 42 is connected to the fixed segment 30 by the ball elements 38, which are disposed for limited back and forth movement in the grooves 41 and 37. Since the grooves 37 are formed in part of the fixed segment 30 and the balls 38 disposed therein are also in the grooves 41 of the outer race 42, it will be obvious that rotation of the disk 5 and the race 42 about an axis coincident with the longitudinal axis of the pintle 46 will be prohibited; however, due to the movement permitted of the balls 38 and the arcuate form of the grooves 37 and 41, the race 42 and disk 5 are free to swing for a limited distance in any direction. If the end 47 of the pintle 46 is swung in a full circular arc by the crank 53, a peculiar rolling nod-like progression known as "nutation" is imparted to the disk 5.

Figure 3:
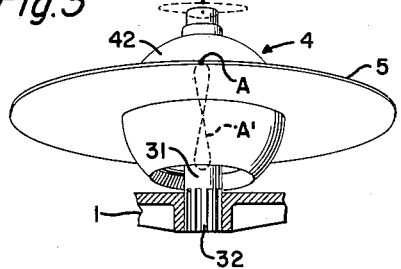
Fig. 3 is a plan view of the nutating disk and suspension components of the present device shown removed from the remaining structure.
Figure 2:
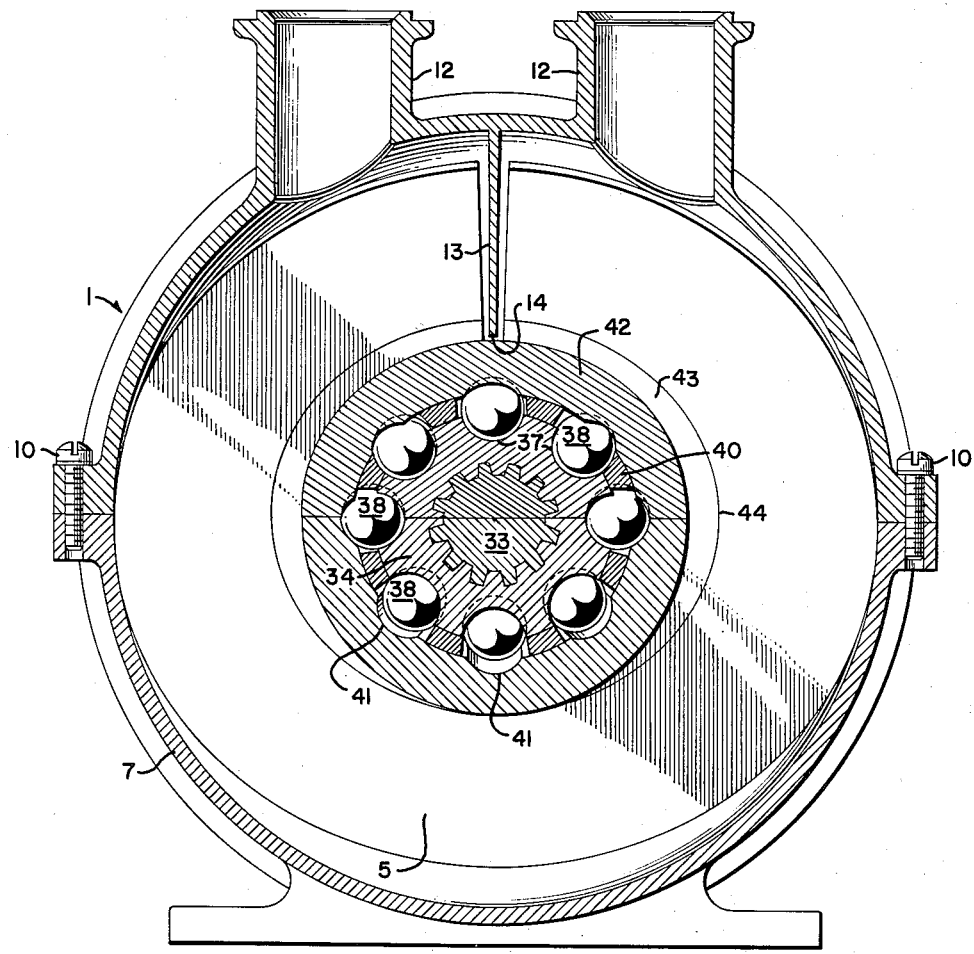
Fig. 2 is a transverse sectional view of the device shown in Fig. 1 taken on line 2—2 of Fig. 1.

Although rotation of the disk 5 is prohibited during nutation, a certain amount of side-to-side shifting or oscillation of the disk 5, relative to the housing 1, is unavoidable in a natural nutating cycle, and if this shifting or oscillation is resisted at high nutating speeds, serious inertial forces and vibrations will result. The above-mentioned oscillating movement is illustrated in Fig. 3, wherein the movement of an imaginary point A, taken arbitrarily to be located on the peripheral arc at the top of disk 5, is indicated by the dotted line A. The point A will move through this "figure 8" path at the disk 5 nutates, due to the side-to-side lateral oscillation of disk 5, which is simultaneously compounded with the back and forth tilting thereof. It will be noted, therefore, that the movable segment 29 of the universal joint 4 and the disk 5, when operated in conjunction with crank 53, cooperate to produce a perfect nutating progression in the disk 5, including the necessary figure 8 motion required in an unrestrained or natural nutating cycle.

In operation, the present device may be used either as a motor or pump, depending upon whether the movable segment 29 is driven by the nutating disk 5 or the shaft 55. If the device is to be operated as a motor, the movable element 29 will be driven by the disk 5, due to the fluid pressure forces in chamber 3 acting on the disk 5. If the device is to be operated as a pump, the movable segment 29 will be driven by an external source of rotary power applied to shaft 55.

In operation as a motor, fluid under pressure is admitted into chamber 3 through one of the passages 12, thereafter to be directed by the dividing wall 13 to flow in a circumaxial direction through the chamber 3 toward the other passage 12. Due to the conical shape of the walls 2 and the cant of disk 5, the chamber 3 is divided into a plurality of opposed, semiannular, wedge-shaped subchambers or compartments, and the fluid flowing therethrough will progress from the broad end of the wedge to the point thereof. The movement of fluid under pressure from the broad edge of the wedge to the point will force the disk 5 away from the wall 2 at that point, and as it progresses circumaxially through chamber 3 in this manner will cause nutation of the disk 5. The motion of disk 5 will be transmitted through the race 42 to the pintle 46. Motion of the pintle 46, in cooperation with the crank 6, is transmitted to the shaft 55 to drive any mechanism connected therewith. It will be noted that the choice relating to which passage 12 should be used as an inlet or outlet will depend on the direction of rotation intended for shaft 55, since the passage chosen will determine the direction of fluid flow, and the direction of fluid flow through chamber 3 will determine the direction of rotation of shaft 55.

In operation as a pump, rotary motion is applied to shaft 55, by a motor or other means not shown, which in turn is transmitted through the crank 6 and pintle 46 to the race 42, thereby causing nutation of disk 5. Since the disk 5 forms a movable dividing wall extending diagonally through chamber 3 and the nutation of disk 5 causes the divisions formed thereby to progress circumferentially through the chamber 3, it will be obvious that any fluid in these divisions will necessarily have to follow their movement. It will be understood, therefore, that if one of the passages 12 is connected to a supply of fluid which is allowed passage therefrom into chamber 3, the nutation of disk 5 will drive the fluid thus introduced through the chamber 3, as described above, to the opposite passage 12, which will form an outlet therefor.

It will be apparent from the above description that the nutating element must be restrained by the suspension means against the influence of torque, and any of the various types of universal joints now employed or known to the art, which are composed of at least two parts, either of which is capable of transmitting torque to the other, could be modified for use in the nutating disk device set forth above. The ball-bearing type constant velocity universal joint similar to the one shown and described in Patent No. 1,975,758 to B. K. Stuber, dated October 2, 1934, is preferred, in that it permits uniform nutating motion of the disk with constant output shaft speed.

I claim:

1. In a fluid displacement device, the combination comprising: a housing defining a chamber having inlet and outlet passages, and a flow-dividing wall extending transversely of the chamber at one side between said inlet and outlet passages; a universal joint of the type having internal and external segments and means forming a torque transmitting connection between said segments; means nonrotatably securing the internal segment to said housing and extending the same into said chamber to support the other segment of said universal joint for nutating movement; a nutating disk disposed in said chamber and attached for movement with the external segment of said universal joint; and a crank means journaled for rotation in said housing and having a motion-transmitting engagement with the external segment of said universal joint.

2. In a fluid displacement device, the combination comprising: a housing defining a chamber having inlet and outlet passages, and a flow-dividing wall extending transversely of the chamber at one side between said inlet and outlet passages; a constant velocity universal joint of the type having internal and external segments and means forming a torque transmitting connection between said segments; means nonrotatably securing the internal segment to said housing and extending the same into said chamber to support the other segment of said constant velocity universal joint for nutating movement; a nutating disk disposed in said chamber and attached for movement with the external segment of said universal joint; and a crank means journaled for rotation in said housing and having a motion-transmitting engagement with the external segment of said universal joint.

3. In a fluid displacement device, the combination comprising: a housing defining a chamber having inlet and outlet passages, and a flow-dividing wall extending transversely of the chamber at one side between said inlet and outlet passages; a ball-bearing type constant velocity universal joint of the type having a pair of segments and means forming a torque transmitting connection between said segments, one of said segments being nonrotatably secured to said housing and extending into said chamber to support the other segment of said universal joint for nutating movement; a nutating disk disposed in said chamber and attached for movement with the movable segment of said universal joint; and a crank means journaled for rotation in said housing and having a motion-transmitting engagement with the movable segment of said universal joint.

4. In a fluid displacement device, the combination comprising: a housing defining a chamber having inlet and outlet pasages and a flow-dividing wall extending transversely of the chamber at one side thereof between said inlet and outlet passages; a universal joint of the type having a spherical outer surface which cooperates with said housing to form a seal therein, and a pair of segments having means forming a torque transmitting connection between said segments, one of said segments being nonrotatably secured to said housing and extending into said chamber to suport the other segment thereof for nutating movement; a nutating disk disposed in said chamber and attached for movement with the movable segment of said universal joint; and a crank means journaled for rotation in said housing and having a motion-transmitting engagement with the movable segment of said universal joint.

5. In a fluid displacement device, the combination comprising: a housing defining a chamber having inlet and outlet passages and a flow-dividing wall extending transversely of said chamber at one side thereof between said inlet and outlet passages; a constant velocity universal joint of the type having a spherical outer surface which cooperates with said housing to form a seal therein and a pair of segments having means forming a torque transmitting connection between said segments, one of said segments being nonrotatably secured to said housing and extending into said chamber to support the other segment thereof for nutating movement; a nutating disk disposed in said chamber and attached for movement with the movable segment of said universal joint; and a crank means journaled for rotation in said housing and having a motion-transmitting engagement with the movable segment of said universal joint.

6. In a fluid displacement device, the combination comprising: a housing defining a chamber having inlet and outlet passages, and a flow-dividing wall extending transversely of the chamber at one side thereof between said inlet and outlet passages; a ball-bearing type constant velocity universal joint of the type having a spherical outer surface which cooperates with said housing to form a seal therein and a pair of segments having a torque transmitting connection between said segments, one of said segments being nonrotatably secured to said housing and extending into said chamber to support the other segment of said universal joint for nutating movement; a nutating disk disposed in said chamber and attached for movement with the movable segment of said universal joint; and a crank means journaled for rotation in said housing and having a motion-transmitting engagement with the movable segment of said universal joint.

7. In a fluid displacement device, the combination comprising: a housing defining a chamber having inlet and outlet passages, and a flow-dividing wall extending transversely of the chamber at one side thereof between said inlet and outlet passages; a universal joint of the type having a pair of segments having means forming a torque transmitting connection between said segments, one of said segments being secured to said housing and extending into said chamber to support the other segment of said universal joint for nutating movement; a nutating disk disposed in said chamber and attached for movement with the movable segment of said universal joint; and a counterbalanced crank means journaled for rotation in said housing and having a motion-transmitting engagement with the movable segment of said universal joint.

8. In a fluid displacement device, the combination comprising: a housing defining a chamber having inlet and outlet passages, and a flow-dividing wall extending transversely of the chamber at one side thereof between said inlet and outlet passages; a constant velocity universal joint of the type having a pair of segments having means forming a torque transmitting connection between said segments, one of said segments being secured to said housing and extending into said chamber to support the other segment of said constant velocity universal joint for nutating movement; a nutating disk disposed in said chamber and attached for movement with the movable segment of said universal joint; and a counterbalanced crank means journaled for rotation in said housing and having a motion-transmitting engagement with the movable segment of said universal joint.

9. In a fluid displacement device, the combination comprising: a housing defining a chamber having inlet and outlet passages, and a flow-dividing wall extending transversely of the chamber at one side thereof between said inlet and outlet passages; a ball-bearing type constant velocity universal joint of the type having a pair of segments having means forming a torque transmitting connection between said segments, one of said segments being secured to said housing and extending into said chamber to support the other segment of said universal joint for nutating movement; a nutating disk disposed in said chamber and attached for movement with said movable segment of said universal joint; and a counterbalanced crank means journaled for rotation in said housing and having a motion-transmitting engagement with the movable segment of said universal joint.

10. In a fluid displacement device, the combination comprising: a housing defining a chamber having inlet and outlet passages and a flow-dividing wall extending transversely of said chamber at one side thereof between said inlet and outlet passages; a universal joint of the type having a spherical outer surface which cooperates with said housing to form a seal therein and a pair of segments having a torque transmitting connection between said segments, one of said segments being secured to said housing and extending into said chamber to support the other segment of said universal joint for nutating movement; a nutating disk disposed in said chamber and attached for movement with the movable segment for said universal joint; and a counterbalanced crank means journaled for rotation in said housing and having a motion-transmitting engagement with the movable segment of said universal joint.

11. In a fluid displacement device, the combination comprising: a housing defining a chamber having inlet and outlet passages and a flow-dividing wall extending transversely of said chamber at one side thereof between said inlet and outlet passages; a constant velocity universal joint of the type having a spherical outer surface which cooperates with said housing to form a seal therein and a pair of segments having means forming a torque transmitting connection between said segments, one of said segments being secured to said housing and extending into said chamber to support the other segment of said universal joint for nutating movement; a nutating disk disposed in said chamber and attached for movement with the movable segment of said universal joint; and a counterbalanced crank means journaled for rotation in said housing and having a motion-transmitting engagement with the movable segment of said universal joint.

12. In a fluid displacement device, the combination comprising: a housing defining a chamber having inlet and outlet pasages and a flow-dividing wall extending transversely of said chamber at one side thereof between said inlet and outlet passages; a ball-bearing type constant velocity universal joint of the type having a spherical outer surface which cooperates with said housing to form a seal therein and a pair of segments having a torque transmitting connection between said segments, one of said segments being secured to said housing and extending into said chamber to support the other segment of said universal joint for nutating movement; a nutating disk disposed in said chamber and attached for movement with the movable segment of said universal joint; and a counterbalanced crank means journaled for rotation in said housing and having a motion-transmitting engagement with the movable segment of said universal joint.

13. In a fluid pressure energy translating device, the combination comprising: a housing defining a chamber having inlet and outlet passages, and a flow-dividing wall extending transversely of the chamber at one side between said inlet and outlet pasages; a shaft member rigidly secured to said housing and projecting into said chamber; a universal joint supported by said shaft member, said universal joint having an inner section rigidly connected with said shaft member and an outer section; torque transmitting means connecting said sections to provide for nutating movement of the outer section on the inner section; a disk provided on said outer section for nutating movement therewith; and crank means journalled in said housing, said crank means having a motion transmitting connection with the outer section of said universal joint.

14. In a fluid pressure energy translating device, the combination comprising: a housing defining a chamber having inlet and outlet passages, and a flow-dividing wall extending transversely of the chamber at one side between said inlet and outlet passages; a shaft member rigidly secured to said housing and projecting into said chamber; an inner spherical element rigidly supported by said shaft member; an outer hollow spherical element surrounding said inner spherical element, said inner and outer elements having registering external and internal grooves, respectively, formed therein; a ball element confined in each set of registering grooves, said ball and groove relationship providing for nutating movement of said outer spherical element; disk means provided on said outer spherical element for nutating movement therewith; an output shaft journalled in said housing; and motion transmitting means connecting said outer spherical element and said output shaft, said motion transmitting means translating the nutating motion of said outer spherical element into rotary movement of said output shaft.

References Cited in the file of this patent

FOREIGN PATENTS

| | | |
|---|---|---|
| 452,485 | Thomson | May 19, 1891 |
| 568,759 | Hood | Oct. 6, 1896 |
| 1,100,635 | Urkewitz | June 16, 1914 |
| 1,975,758 | Stuber | Oct. 2, 1934 |

UNITED STATES PATENT OFFICE
CERTIFICATION OF CORRECTION

Patent No. 2,969,777                        January 31, 1961

George F. Blazs

It is hereby certified that error appears in the above numbered patent requiring correction and that the said Letters Patent should read as corrected below.

Column 3, line 35, for "at the" read -- as the --; column 6, line 42, for "segment for" read -- segment of --.

Signed and sealed this 4th day of July 1961.

(SEAL)
Attest:

ERNEST W. SWIDER                        DAVID L. LADD

Attesting Officer                          Commissioner of Pat